July 12, 1966 W. E. GLENN, JR 3,261,022

TAPE TRANSPORT APPARATUS

Filed Nov. 1, 1961

Inventor:
William E. Glenn Jr.,
by John P. Dellitt
His Attorney.

United States Patent Office 3,261,022

Patented July 12, 1966

3,261,022
TAPE TRANSPORT APPARATUS

William E. Glenn, Jr., Scotia, N.Y., assignor to General Electric Company, a corporation of New York Filed Nov. 1, 1961, Ser. No. 149,467
10 Claims. (Cl. 346—74)

Figure 1:
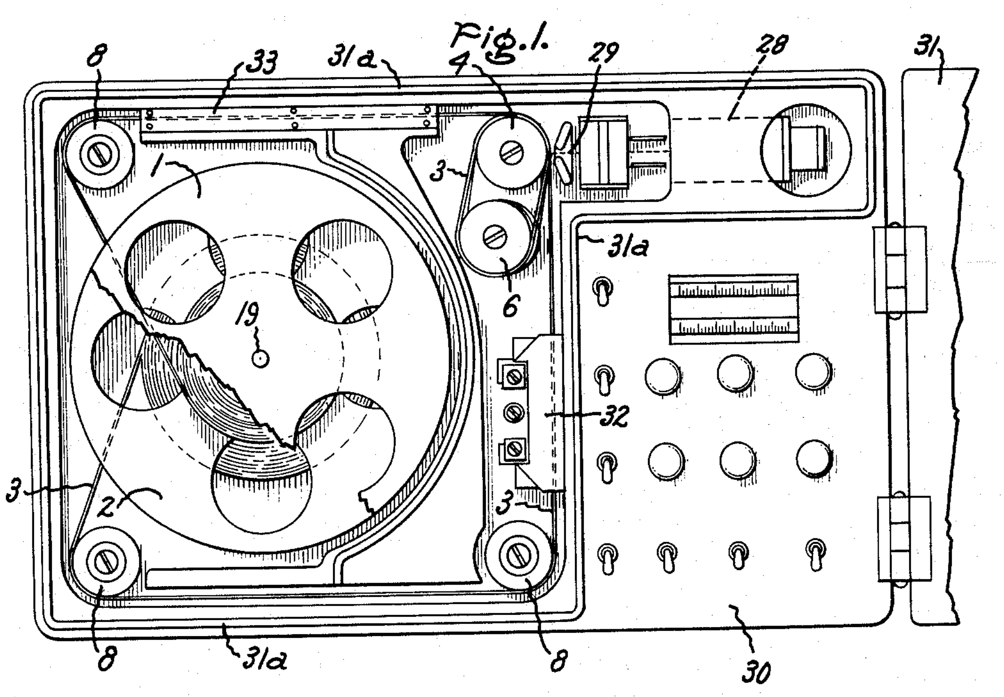

The present invention relates to a tape transporting apparatus and particularly to an improved apparatus for recording on thermoplastic tape which apparatus provides a driving contact with only one side of a thermoplastic tape.

Thermoplastic tape recording involves impressing light refracting or diffracting undulations on the transparent thermoplastic material. When tape bearing recorded information of this type is placed in a Schlieren optical system including a light source and a light masking system for masking nondiffracted light, the recorded images are readily observable and may be projected conveniently upon a viewing screen.

The thermoplastic tape may, for example, include a plastic base with a transparent conducting medium thereon superimposed with a thermoplastic deformable medium. In recording, this tape with its deformable medium in a heated state is passed in front of an electron writing beam directed upon the deformable medium. An image conveying charge pattern is thereby established between the surfaces of the deformable medium and this charge pattern in turn establishes the optical deformations in the deformable medium by drawing charged areas toward the conducting medium. The tape is subsequently cooled, rendering these deformations permanent. This type of tape and tape recording is more fully set forth and claimed in my copending application Serial No. 8,842, filed February 15, 1960, now Patent No. 3,113,179, said application being a continuation-in-part of my application Serial No. 698,167, filed November 27, 1957 (now abandoned), and of my application Serial No. 783,584, filed December 29, 1958 (now abandoned).

As will be appreciated by those skilled in the art, it is highly desirable for the thermoplastic medium to remain undamaged and unaffected by its physical environment in order to permit the highest fidelity recording by eliminating imperfections. The undulations in the deformable medium have dimensions on the order of microns. Any scratching or marring of the tape will cause undesirable noise or streaks in the image when the tape is subsequently projected on a screen. However, customary tape handling mechanisms employ drive capstans together with pinch rollers and takeup mechanisms which contact the tape on both sides thereof. These drive mechanisms are found undesirable because even the rolling pressure of a pinch roller arranged to force the tape against a drive capstan has the effect of deteriorating the image, leaving scuffs, mars and scratches which subsequently project upon a screen together with or instead of the intended information.

One possible apparatus for driving an optical tape without requiring a driving contact to the image bearing surface is the sprocket drive. However, a sprocket drive does not permit maximum utilization of desirably small, accurately placed images upon the thermoplastic medium. Moreover, sprocket drive causes jitter and bounce in the moving tape rather than accurate smooth movement. It is often desired to use continuous motion projection rather than frame-by-frame projection of a thermoplastic image wherein projection is synchronized with images upon a continuously moving tape. It is found that sprocket drive accuracy is not satisfactory for this type of operation. Also, if the tape image is to be read a line at a time, for example, by television camera tube means, sprocket drive does not allow accurate information registration. Furthermore, sprocket drive devices frequently require the previously mentioned pinch roller type of mechanism to insure tape follow far enough around the sprocket drive for causing a good driving engagement therewith. And, of course, a sprocket drive requires a wider tape.

It is therefore an object of the present invention to provide an improved tape recording apparatus for higher quality recording which substantially eliminates marring of the recording surfaces.

It is another object of the present invention to provide a tape recording apparatus which drives a tape for movement thereof while contacting the tape only on a non-information bearing side thereof.

In accordance with the present invention the tape is caused to follow a generally spiral path having a greater than 360° contact around a capstan drive mechanism with the information bearing side facing outwardly from the mechanism. In this manner sufficient engagement occurs between the tape and the driving mechanism to drive the tape satisfactorily and accurately without material slippage and without the necessity of pinch roller type devices for forcing the tape against the driving mechanism.

In accordance with a feature of the present invention the driving mechanism includes a pair of cylindrical capstans disposed at an angle to one another with the tape being wound around the collective capstans a plurality of times. The capstan axes are inclined with respect to one another and lie in two parallel planes approximately perpendicular to the tape direction therebetween whereby the tape wraps smoothly in frictionally engaging contact therewith but without tape stretching or distortion. The capstans are sufficiently inclined to cause the tape in the course of wrapping around the capstans to transfer from a first entrance level to an exit level substantially parallel to the first level. In this manner the additional advantage is secured of being able to place the tape supply upon a pair of reels which take up little more space than one reel. That is the sides of the reels may be juxtaposed with the reels "on top of" one another, or even on the same shaft, thereby securing increased tape storage in a limited amount of space.

In accordance with another feature of the present invention the aforementioned takeup and supply reels are "driven" by a differential arrangement coaxial to the tape supply and takeup reels permitting smooth payout and takeup of the tape and employing only one source of takeup torque.

Figure 2:
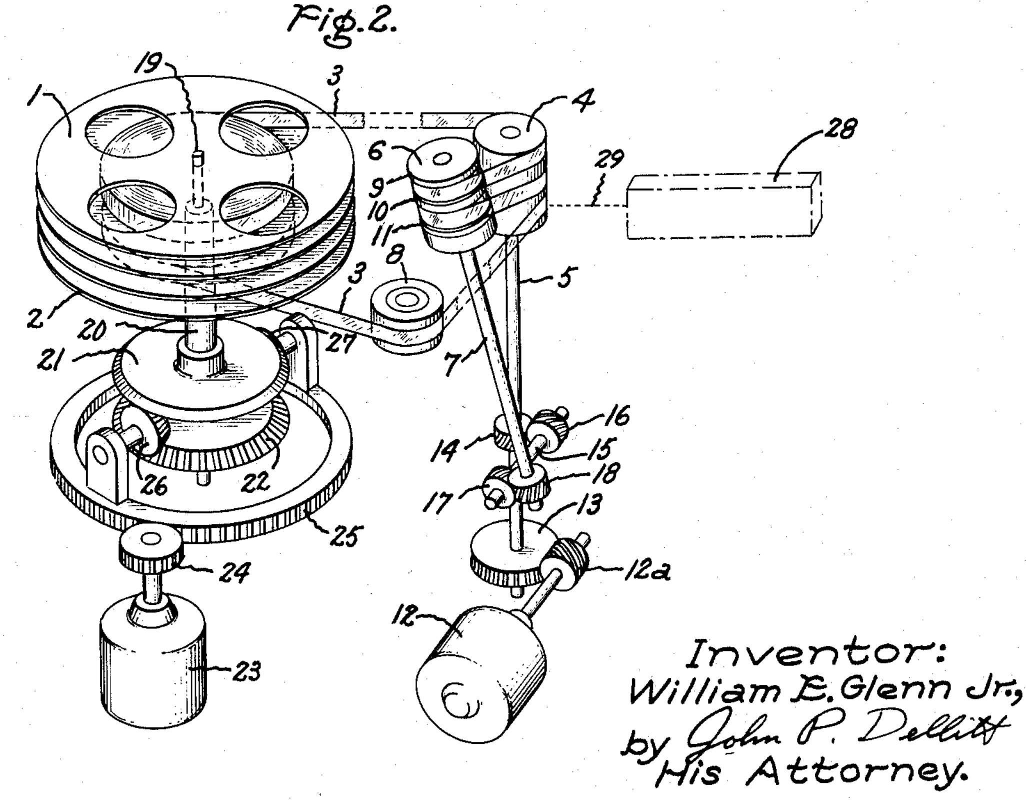

The subject matter which I regard as my invention is particularly pointed out and distinctly claimed in the concluding portion of this specification. The invention, however, both as to organization and methods of operation, together with further objects and advantages thereof, may best be understood by reference to the following description taken in connection with the accompanying drawings wherein like reference characters refer to like elements and in which:

FIG. 1 is a plan view of a tape recording apparatus in accordance with the present invention, and FIG. 2 is a cutaway perspective representation of a simplified embodiment of a mechanism in accordance with the present invention.

Referring to the similar embodiments of FIGS. 1 and 2, coaxially arranged supply and takeup tape reels 1 and 2 carry a thermoplastic tape web 3 therebetween, this tape web being attached at either end thereof to wind around the said reels. Either of the reels may function alternatively as the takeup or supply reel, in accordance with a desired direction of tape travel, and reversal may be conveniently accomplished. The tape 3 is of the type described and claimed in my aforementioned copending application Serial No. 8,842, and has a thermoplastic coating upon the outside thereof, that is on the side extending radially outward from the reel, for receiving optically responsive undulations thereupon. Underneath this thermoplastic coating is a transparent conducting coating as more fully described and claimed in the aforementioned copending application.

A first cylindrical capstan 4 which may be conveniently formed of non-magnetic metal, e.g., aluminum or dural metal, has an axis parallel to the axis of said tape reels and is joined to a driving shaft 5, parallel to the axis of the tape reels. A second cylindrical capstan 6, conveniently having the same diameter as capstan 4, is disposed adjacent capstan 4 but has an axis and a driving shaft 7 inclined at an angle with respect to capstan 4 and shaft 5. This angle may be a small angle, approximately 13°, depending upon the tape dimensions as hereinafter more fully set forth. The axis (shaft 7) of capstan 6 lies in a plane parallel to a plane including the axis (shaft 5) of capstan 4 and these two planes are preferably perpendicular to the general or average direction of tape travel between the two capstans. The inclination of the capstans should desirably be about a cross-axis approximating this direction, with as much tape contacting the capstans above the cross-axis as below it.

Both capstans are arranged radially away from supply and takeup reels 1 and 2, with the tape 3 winding collectively around the pair of capstans as a group a plurality of times. In the simplified embodiment of FIG. 2, for example, the capstan 6 is arranged between capstan 4 and the tape reels. The tape 3 clearing capstan 6, first winds part way around capstan 4 and then to capstan 6. After winding approximately half-way around capstan 6, the tape returns to capstan 4, then back to 6 and then back to 4 again. It is observed the tape wraps around the pair of capstans as a group approximately 2¼ times before leaving the capstans, this being more than sufficient frictional engagement to provide a positive non-slipping drive to the plastic tape. It is also observed that the thermoplastic or recording side of tape 3 does not touch the driving mechanism at any point nor are pinch rollers required bearing upon the recording side of the tape. After leaving capstan 4, the tape winds approximately one-quarter of the way around the outside of pulley 8, to clear capstan 6, before returning to the supply reel, pulley 8 also not touching the thermoplastic side of the tape.

In the FIG. 1 embodiment other pulleys of the pulley 8 type are provided along a desired tape path to conveniently guide the tape to and from the reels. It is appreciated that greater or lesser numbers of such pulleys may be employed which contact the tape only on the noninformation bearing side.

Capstan 6 is inclined with respect to the capstan 4 at such an angle that the tape in proceeding from capstan 4 to 6, and back to 4, will not overlap itself on capstan 4. This is achieved by arranging shaft 7 approximately at an angle $\theta$ with respect to the other capstan axis such that $\pi r \tan \theta$ is greater than the tape width, wherein "$r$" is the radius of capstan 6. Capstan 6 is preferably formed with ridges at 9, 10 and 11 providing cylindrical channels to receive the tape as the tape passes around capstan 6. These tape receiving channels, being only slightly wider than the tape, insure a registration of the tape so that the tape has little tendency to move in a vertical direction. This, together with the orientation of the capstan shafts 5 and 7 in parallel planes facing one another, insures accurate and positive frictional engagement of the tape for the full two and one-quarter revolutions as the tape winds around the capstans. The capstan shafts are disposed in parallel planes to prevent slack or distortion of the tape or stretching of the tape in an outward or horizontal direction as the tape proceeds around the capstans.

Both capstan shafts 5 and 7 are preferably positively driven in the same direction employing a synchronous drive motor 12 as a power source. Motor 12, drives a worm gear 12*a* engaging a gear 13 secured upon capstan shaft 5, the capstan 4 thereby receiving synchronous motion from motor 12. A first helical gear 14 also mounted upon capstan shaft 5 drives a horizontally disposed shaft 15 by engaging a helical gear 16 on the latter shaft. Helical gear 17 on the same shaft is disposed for driving a fourth helical gear 18 secured upon angularly-oriented capstan drive shaft 7. All the shafts have a one-to-one driving ratio so that the capstan 6 is driven in synchronism with capstan 4.

In addition to having the advantage of noncontact with the thermoplastic image receiving surface of the tape, the present apparatus has an additional advantage in that the tape 3 enters upon capstan 4 at a first level and leaves capstan 4 at a second level sufficiently below the first level so that the supply and takeup reels 1 and 2 may clear one another although superimposed substantially coaxially with one another. This arrangement has a material advantage in tape storage capacity over the conventional tape arrangement, wherein one reel is mounted on one side of a recording head while the remaining reel is located on the opposite side of the recording head in the same plane as the first reel. If so desired, the present recorder tape handling apparatus may have lateral dimensions little more than the tape reel diameters.

Moreover a side-by-side coaxial arrangement facilitates a common torque arrangement for taking up the tape on one reel while restraining slack in payout of tape from the other. In accordance with an additional feature of the present invention, the two reels are torque-driven by a torque motor in a differential arrangement permitting concurrent takeup and payout of the tapes wherein a compact arrangement of the mechanism is achieved. In the illustrated embodiment, reel 1, being the topmost reel, is mounted upon a shaft 19 which is coaxially received within a hollow shaft 20 upon which is mounted the lower reel 2. The hollow shaft 20 is secured to a driven gear 21 of a differential mechanism, this driven gear being located on the same side of the differential mechanism as the tape reels 1 and 2. Shaft 19 extended through hollow shaft 20 and the driven gear 21 mounted thereon, extends through the differential mechanism to receive power from driven gear 22 on the opposite side of the differential.

Torque motor 23 receiving a pinion 24 upon its shaft, drives a driving ring gear 25 having journalled thereon, at diametrically opposite points, bevel pinions 26 and 27, the latter engaging the driven gears 21 and 22. It is seen that as tape is pulled from reel 1 by the driving capstan, with torque motor tending to take up tape on both reels, takeup reel 2 will be driven in the takeup direction partially because tape is being withdrawn from reel 1. Rotation is required from the shaft of motor 23 as the tape diameters on the two reels differ.

The end purpose of the tape recording apparatus in accordance with the preesnt invention is the recording of optically readable deformations upon the outward thermoplastic coating of the tape 3. For this purpose, an electron gun generally illustrated at 28 generates an electron beam 29 which deposits charge patterns on the tape 3 as tape 3 leaves (or enters) capstan 4. The beam is maintained by electron gun 28 at a relatively high negative potential with respect to the tape's conductive layer and with respect to capstan 4, these latter being generally maintained at ground potential. With the exception of a control area 30, the interior of the recorder is maintained at a relatively low pressure by evacuation means (not shown), glass lid 31 being tightly closed against a seal 31*a*, to facilitate the generation of the electron beam 29. The tape is raised in temperature by heater 32 prior to beam writing and cooled afterward in member 33. This type of recording method and apparatus is more fully described and claimed in my copending applications Serial Numbers (15D–2607) and 8,842, as aforementioned.

The electron beam is generally deflected vertically, with reference to FIG. 2, such that the horizontal tape movement provides a raster movement or "vertical" scan to establish, for example, separate frames or pictures along the surface of the tape. The scan movement of the electron beam is in a direction perpendicular to the tape movement and is generally wider than the picture information in order to establish a synchronous track along the tape consisting of the ends of the scan lines. At the end of each frame, a heavier scan line is similarly impressed upon the tape by the electron beam. In this manner, synchronization of the tape in a reading or projecting mechanism can be achieved without reference to sprocket holes and the like. It is desirable, although certainly not necessary in view of the inherent tape synchronizing mechanism described above, that motor 12 be of the synchronous type whereby the motion imparted to tape 3 by the capstans 4 and 6 is in synchronism with the movement of the electron beam 29, the latter being also synchronized with the 60-cycle supply source of motor 12.

It is seen the present invention achieves driving of recording tape on one side only, while providing sufficient frictional engagement therewith, thereby eliminating marring, scratching, and the like encountered heretofore. Moreover, the driving mechanism changes the tape level so the tape may be initially stored on one level and received on another in a compact relationship. Likewise, a common torque takeup apparatus may be employed by both reels.

Certain departures may be made in the present apparatus if desired, without departing from the broader aspects of the invention. For example, the tape driving capstan arrangement in its basic aspects does not require the tape reels to be coaxially arranged. Neither do they have to be parallel to one another. Also it is not required that either of the capstan axes be parallel to the axis of one of the supply reels, but they may be turned with respect thereto allowing the tape to smoothly twist between the reels and the driving arrangement if so desired. Moreover, both capstans need not be positively driven, nor need they be of the same diameter. One may be of a larger diameter than the other with its shaft being driven at a smaller differentially related speed. Although the capstan shafts should lie in planes generally parallel to one another, which planes are approximately perpendicular to the direction of tape travel therebetween to provide positive drive and prevent tape distortion, it is understood that when the capstans are of different diameter, for example, the direction of tape travel therebetween will be taken for present purposes to be the average direction of tape travel, or the direction half way between divergent tape travel directions. The two planes containing the capstan shafts are then preferably perpendicular to the average direction.

While I have shown and described various embodiments of my invention, it will be apparent to those skilled in the art that many other changes and modifications may be made without departing from my invention in its broader aspects; and I therefore intend the appended claims to cover all such changes and modifications as fall within the true spirit and scope of my invention.

What I claim as new and desire to secure by Letters Patent of the United States is:

1. In a tape recording apparatus, a tape supply reel, a tape takeup reel, a flat tape travelling from said supply reel to said takeup reel, a driving means along said tape between said supply reel and said takeup reel for engaging said tape only on one side thereof, said driving means comprising a plurality of capstans, means for rotating at least one of said capstans, said capstans being inclined with respect to one another with said tape passing around the outside of said plural capstans with only the said one side contacting the said capstans, wherein said tape passes from a first level of a first capstan, and part way around a second capstan which is inclined with respect thereto, whereby the level of said tape is changed relative to said first capstan by virtue of the inclination between said capstans.

2. In a tape transporting apparatus, a tape supply reel, a tape takeup reel, a flat tape travelling between said reels and having an information bearing surface on one side thereof, driving means for driving said tape only on one side thereof comprising a pair of cylindrical capstans of similar diameter, means for rotating at least one of said capstans, said capstans having axes inclined with respect to one another, wherein said tape passes from a first level on a first capstan and part way around a second capstan to return to the first capstan at a level different than said first level by virtue of the relative inclination between said capstans.

3. In a tape transporting apparatus, a tape supply reel on a first level, a tape takeup reel on a second level, a flat tape travelling between said reels, driving means for driving a tape which is adapted to pass between said reels only on one side thereof comprising a pair of cylindrical capstans at least one of which has a cylindrical tape receiving channel, said apparatus being adapted to pass a tape a plural number of times around the combination of said capstans while being longitudinally restrained by said tape receiving channel, the capstan axes being inclined with respect to one another in planes substantially parallel to each other and substantially perpendicular to the general tape direction between the two capstans wherein a diameter of a capstan produces an inclined pitch to prevent overlap of the tape.

4. In a tape transporting apparatus, a tape supply reel on a first level, a tape takeup reel with its side at least partially juxtaposed on a second level parallel to the said supply reel, a flat tape travelling between said reels having an information-receiving surface on one side thereof, driving means for receiving a tape from said supply reel at said first level and returning said tape to the takeup reel at said second level while engaging said tape only on the other side thereof comprising a first cylindrical capstan having an axis substantially parallel with the axis of said supply reel which receives the said tape from said supply reel and returns said tape to said takeup reel, a second cylindrical capstan having a tape receiving channel and having an axis inclined at a small angle with respect to the axis of said first capstan, said tape passing at least twice around the combination of said capstans, wherein said tape passes from said first level at said first capstan around said second capstan in said channel and back to said first capstan at another level, the said second capstan producing a pitch in said tape as the tape passes therearound to prevent overlap of the tape on said first capstan.

5. In a tape handling apparatus, a tape supply reel on a first level, a tape takeup reel on a second level and coaxial with said first reel, a flat tape travelling between said reels and having an information-receiving coating on one side thereof, driving means for driving said tape only on the other side comprising plural capstans with axes angularly related to one another, said tape passing a plural number of times completely around said pair of capstans in a substantially spiral manner due to the inclination of said capstans with respect to one another so that said tape is received from said supply reel at said first level and returned to said takeup reel at said second level, and torque means restraining said coaxial supply and takeup reels comprising a differential mechanism, means for supplying an input torque to said differential mechanism, a first axial output of said differential mechanism acting to drive said supply reel, and a second axial output acting to drive said takeup reel, said input torque means acting in a direction for winding up both reels.

6. In a tape handling apparatus, a tape supply reel, a tape takeup reel, driving means and information transducing means located to drive a tape adapted to pass between said reels, and a restraining mechanism for allowing even payout and takeup of said tape while tending to wind up said tape on both said reels comprising a differential mechanism having a driving gear carrying a pair of pinions whose axis lies substantially across a diameter of said driving gear, a first driven gear engaging said pinions for communicating torque to said supply reel and a second driven gear also engaging said pinions for communicating torque to said takeup reel, wherein either reel may smoothly pay out tape while the other reel is rotating in the opposite direction drawing the tape relatively taut for takeup thereof.

7. The apparatus as set forth in claim 6 including means for communicating torque to said supply reel and said takeup reel comprising a first shaft carrying a first of said reels and a first of said driven gears in spaced relation therealong, and a second shaft which is hollow and coaxial with respect to said first shaft and upon which is mounted the second driven gear and the second reel, said first shaft intermediate its reel and driven gear extending through said hollow second shaft including the said second gear so that said first shaft extends on the same side of said differential mechanism as said second shaft and second reel, said first shaft carrying said first reel beyond said second reel, whereby said reels are coaxially located in spaced relationship on the same side of said differential mechanism.

8. A tape recording apparatus, comprising a supply reel, a takeup reel, a flat thermoplastic tape between said reels having a conductive layer and an information receiving coating on the side outwards of said reels, driving means for driving said tape which driving means contacts only the noncoated side, said driving means comprising a pair of capstans at an angle to one another around which said tape passes a plurality of times in at least partial frictional relationship, the inclination of the capstans relative to one another producing a pitch in said tape as the tape passes around said capstans whereby the tape passes therearound in a spiral manner preventing overlap of the tape, said capstans being formed of nonmagnetic material, and an electron gun maintained at a high negative voltage relative to said capstans and said conductive layer for writing diffraction grating information upon said tape as said tape is in contact with one of said capstans.

9. In a tape recording apparatus, a supply reel, a takeup reel, a flat tape travelling between said reels and having an information-bearing surface on one side thereof, driving means for driving said tape on the other side comprising a pair of cylindrical capstans of similar diameter located along said tape between said reels, with said tape passing a plural number of times completely around the outside of both capstans with its noninformation bearing side contacting the capstans, the capstan axes being inclined with respect to one another in planes substantially parallel to each other and generally perpendicular to the tape direction between the two capstans, a first driving shaft for carrying a first of said capstans and lying in a first of said planes, power means for driving said shaft, a first helical gear also mounted on said first shaft, a second shaft upon which the second capstan is mounted which shaft lies in a second of said planes, said second shaft also having a helical gear mounted thereon, and a third shaft carrying a helical gear for engaging said first helical gear and another helical gear engaging said second helical gear for communicating power from said first shaft to said second shaft to drive said second capstan in synchronism with said first capstan.

10. A tape-driving mechanism comprising a pair of capstans inclined at an angle with respect to one another having similar cylindrical diameters, means for driving said capstans in synchronism with one another, said capstans being adapted to receive therearound a tape passing around both said capstans a plural number of times, the capstan axes being inclined with respect to one another in planes substantially parallel to each other and approximately perpendicular to the direction of tape passage between the two capstans, so that said tape will pass from a first level on a first capstan and substantially halfway around the second capstan to return to the first capstan at a level different from said first level, the capstans producing an inclined pitch in said tape by virtue of their relative inclination thereby preventing overlap of tape on said capstans.

References Cited by the Examiner

UNITED STATES PATENTS

| | | | |
|---|---|---|---|
| 2,372,810 | 4/1945 | Camras | 242—55.01 X |
| 2,706,638 | 4/1955 | Bruderlin et al. | 242—76 X |
| 2,985,866 | 5/1961 | Norton | 340—173 |
| 3,065,355 | 11/1962 | Barnes | 242—55.12 X |

IRVING L. SRAGOW, *Primary Examiner.*

R. M. JENNINGS, P. F. ROTH, *Assistant Examiners.*